No. 894,484. PATENTED JULY 28, 1908.
J. P. CLEAL.
CASH REGISTER.
APPLICATION FILED AUG. 1, 1898.

8 SHEETS—SHEET 1.

WITNESSES:

INVENTOR.
Joseph P. Cleal.
BY
Alvan Macauley.
ATTORNEY

No. 894,484.

PATENTED JULY 28, 1908.

J. P. CLEAL.
CASH REGISTER.
APPLICATION FILED AUG. 1, 1898.

8 SHEETS—SHEET 2.

WITNESSES:

INVENTOR.
Joseph P. Cleal.
BY
Alvan Macauley.
ATTORNEY.

No. 894,484.

PATENTED JULY 28, 1908.

J. P. CLEAL.
CASH REGISTER.
APPLICATION FILED AUG. 1, 1898.

8 SHEETS—SHEET 3.

WITNESSES:

INVENTOR.
Joseph P. Cleal.
BY
Alvan Macauley.
ATTORNEY.

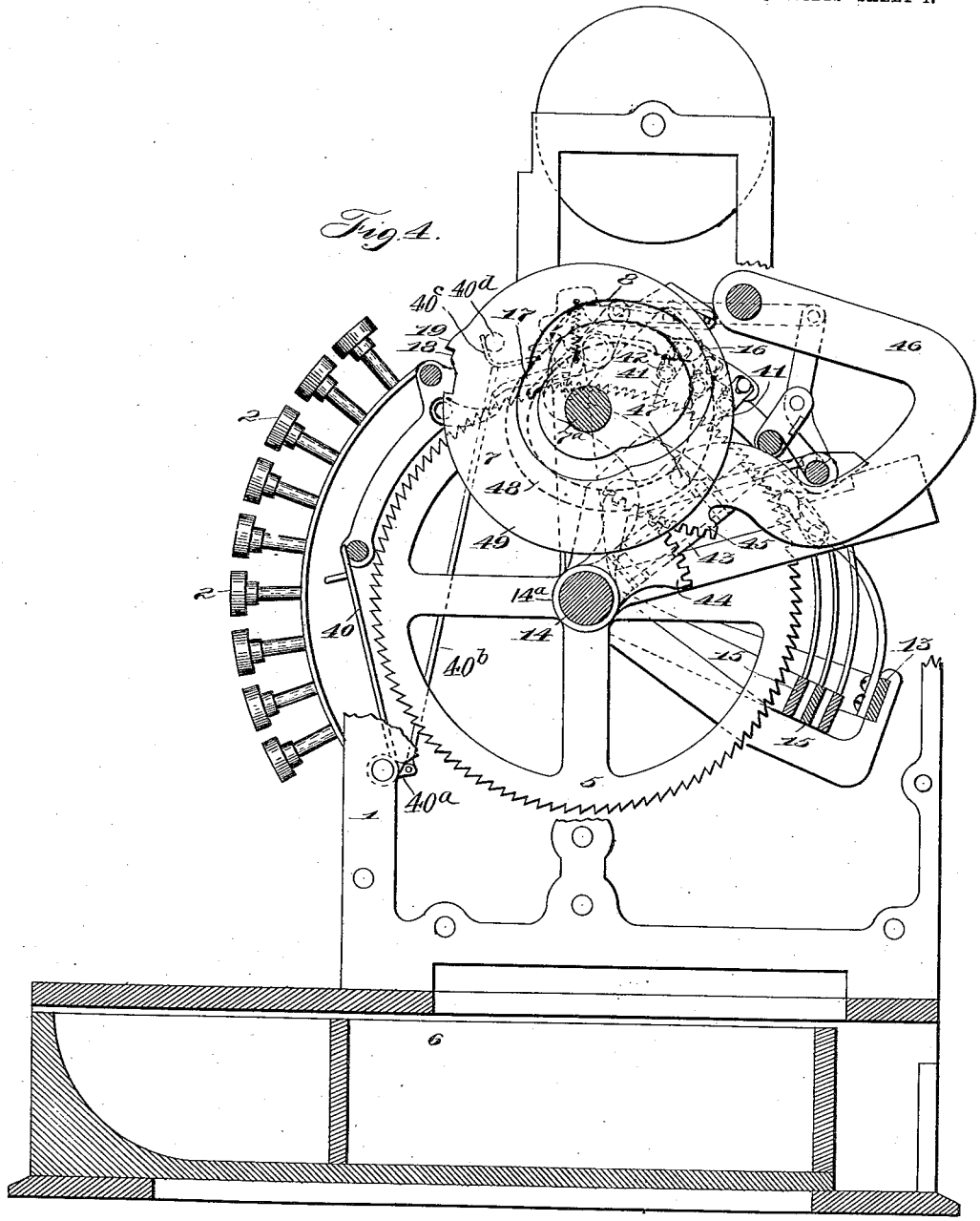

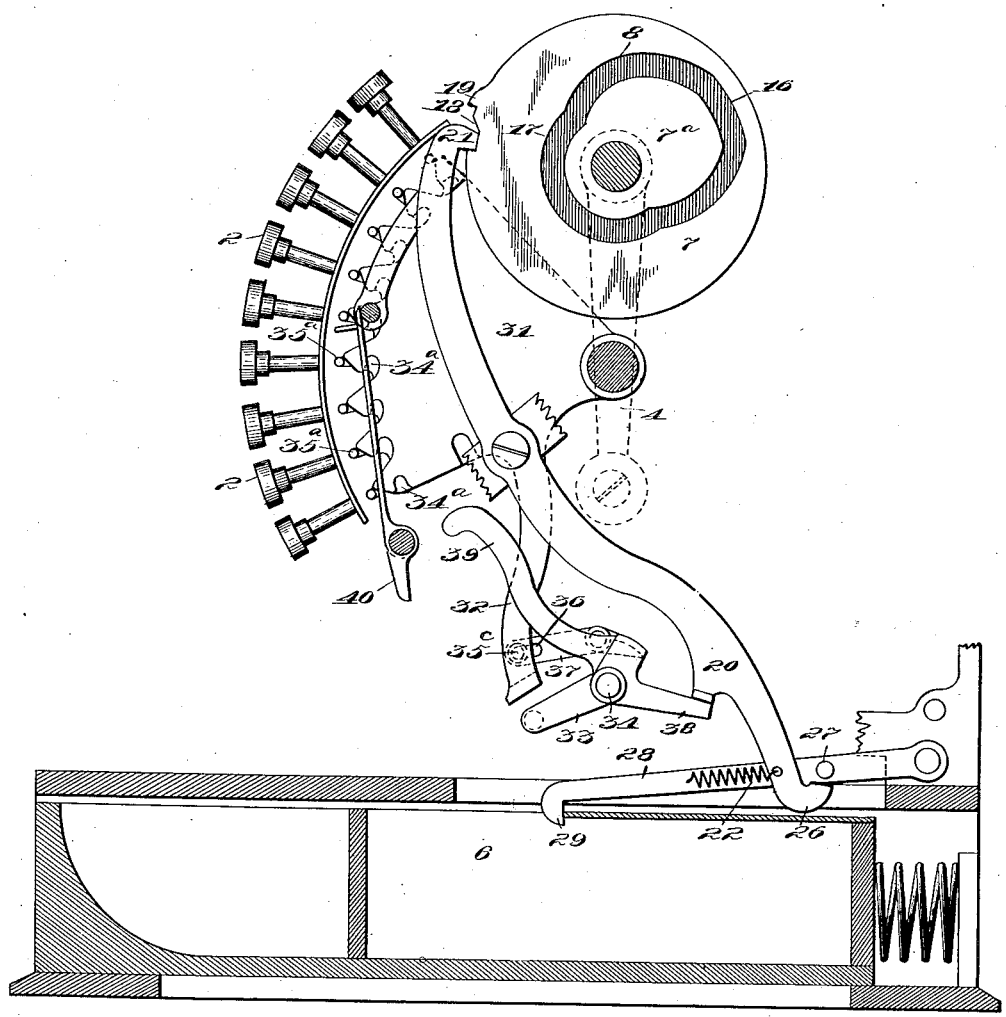

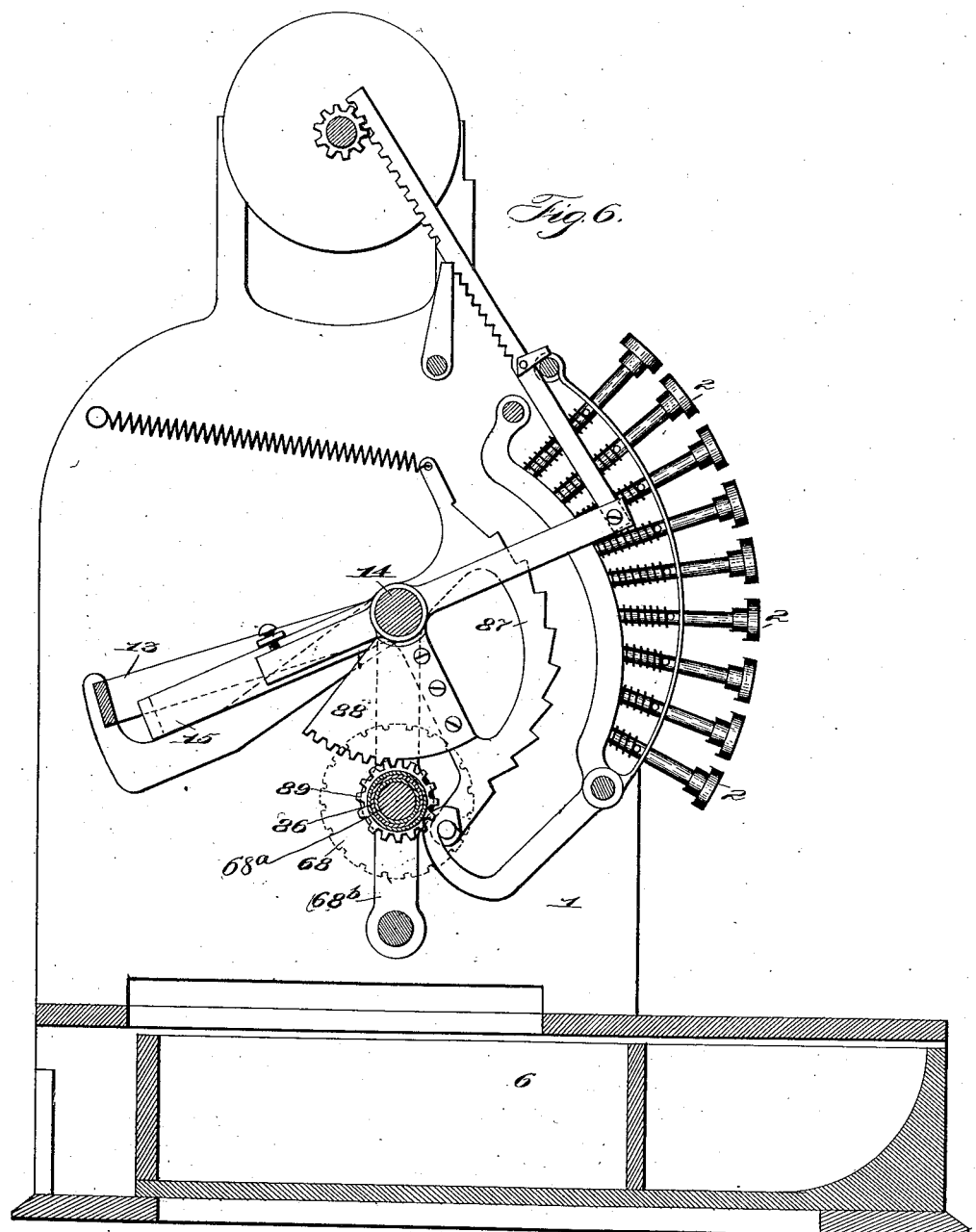

No. 894,484.
PATENTED JULY 28, 1908.
J. P. CLEAL.
CASH REGISTER.
APPLICATION FILED AUG. 1, 1898.
8 SHEETS—SHEET 7.
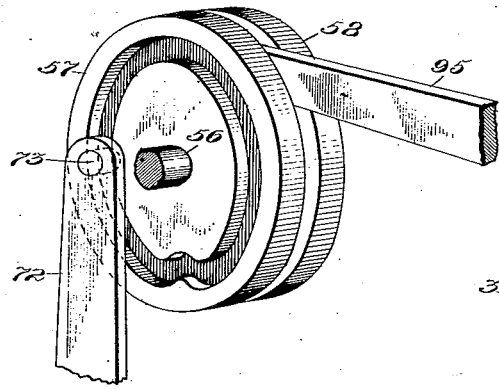
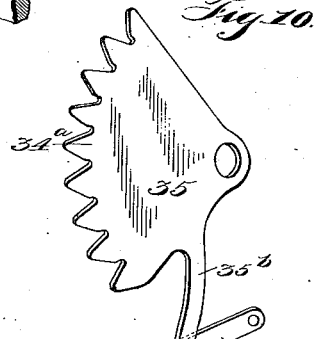
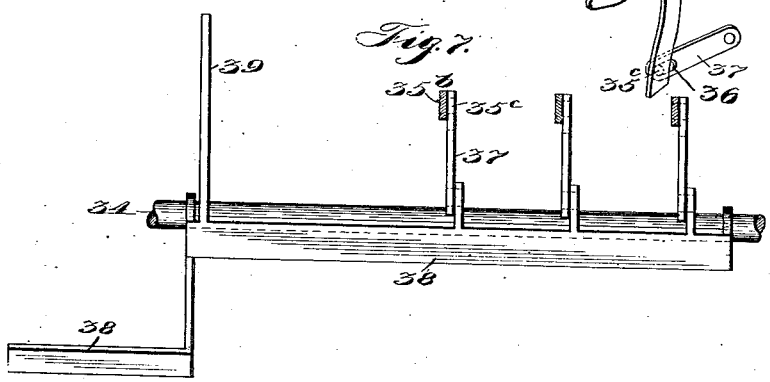
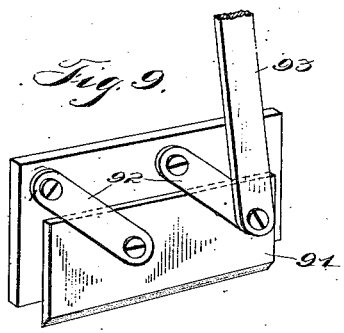
WITNESSES:
Wm. McCarthy
William Suzzy
INVENTOR.
Joseph P. Cleal.
BY
Alvan Macauley
ATTORNEY No. 894,484. PATENTED JULY 28, 1908.
J. P. CLEAL.
CASH REGISTER.
APPLICATION FILED AUG. 1, 1898.
8 SHEETS—SHEET 8.
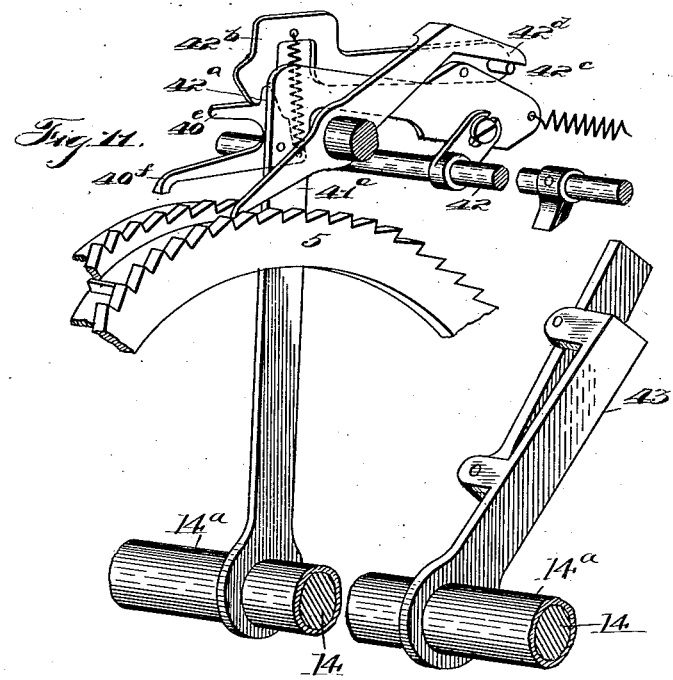
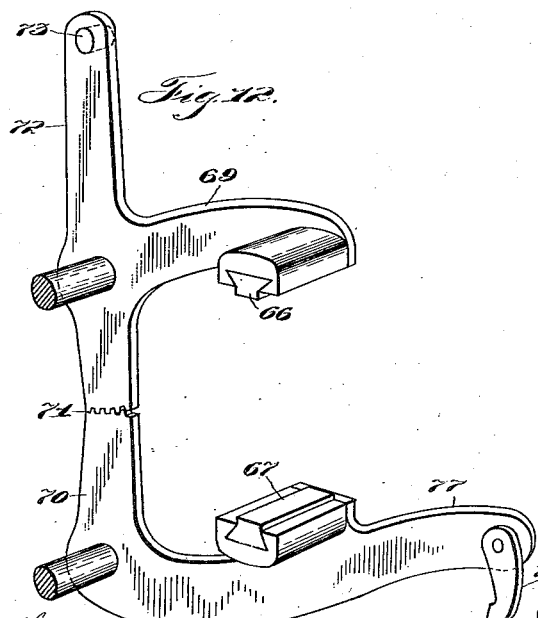
Witnesses
Wm. McCarthy
William Wuzzy
Inventor
Joseph P. Cleal
By Alvan Macauley
Attorney

UNITED STATES PATENT OFFICE.

JOSEPH P. CLEAL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

No. 894,484.

Specification of Letters Patent.

Patented July 28, 1908.

Application filed August 1, 1898. Serial No. 687,420.

*To all whom it may concern:*

Be it known that I, JOSEPH P. CLEAL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers and has more particular relation to improvements in registers of the type patented to J. H. McCormick, No. 570,141, dated October 27, 1896, and No. 610,492, dated September 6, 1898.

One of the several objects of the invention is to provide a machine of the type mentioned with an improved printing mechanism.

Another object is to provide improved operating devices for machines of the aforesaid class.

Figure 1:
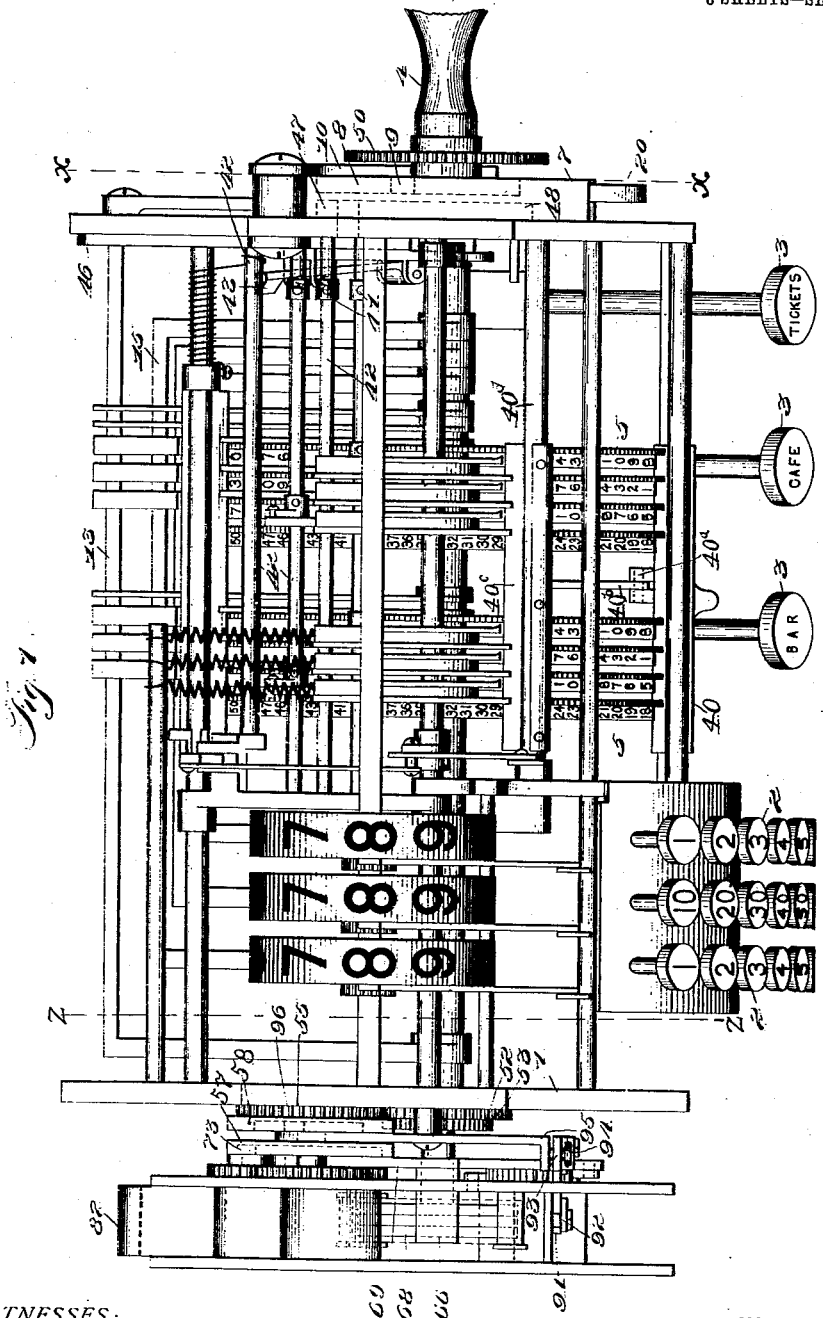
Figure 2:
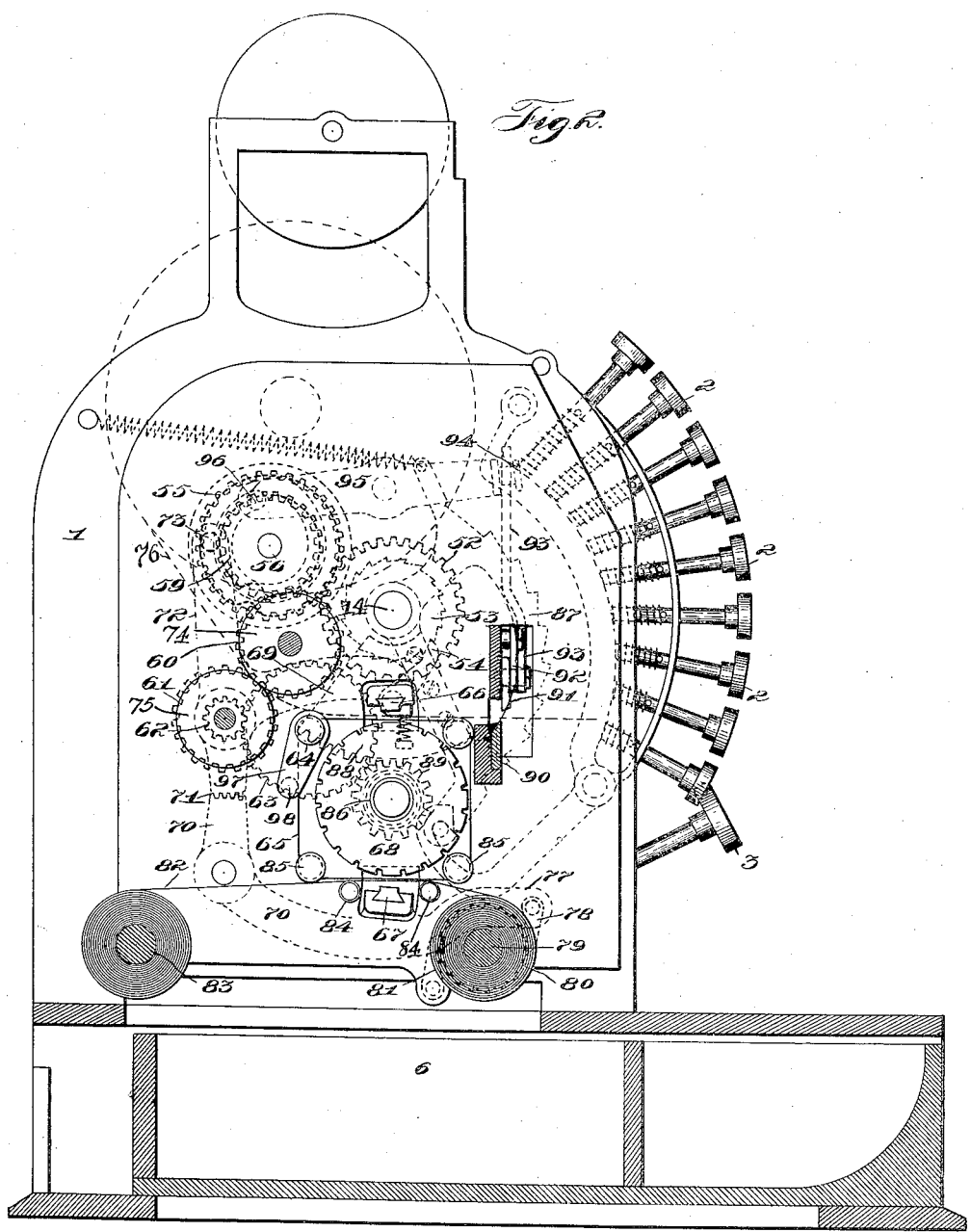
Figure 3:
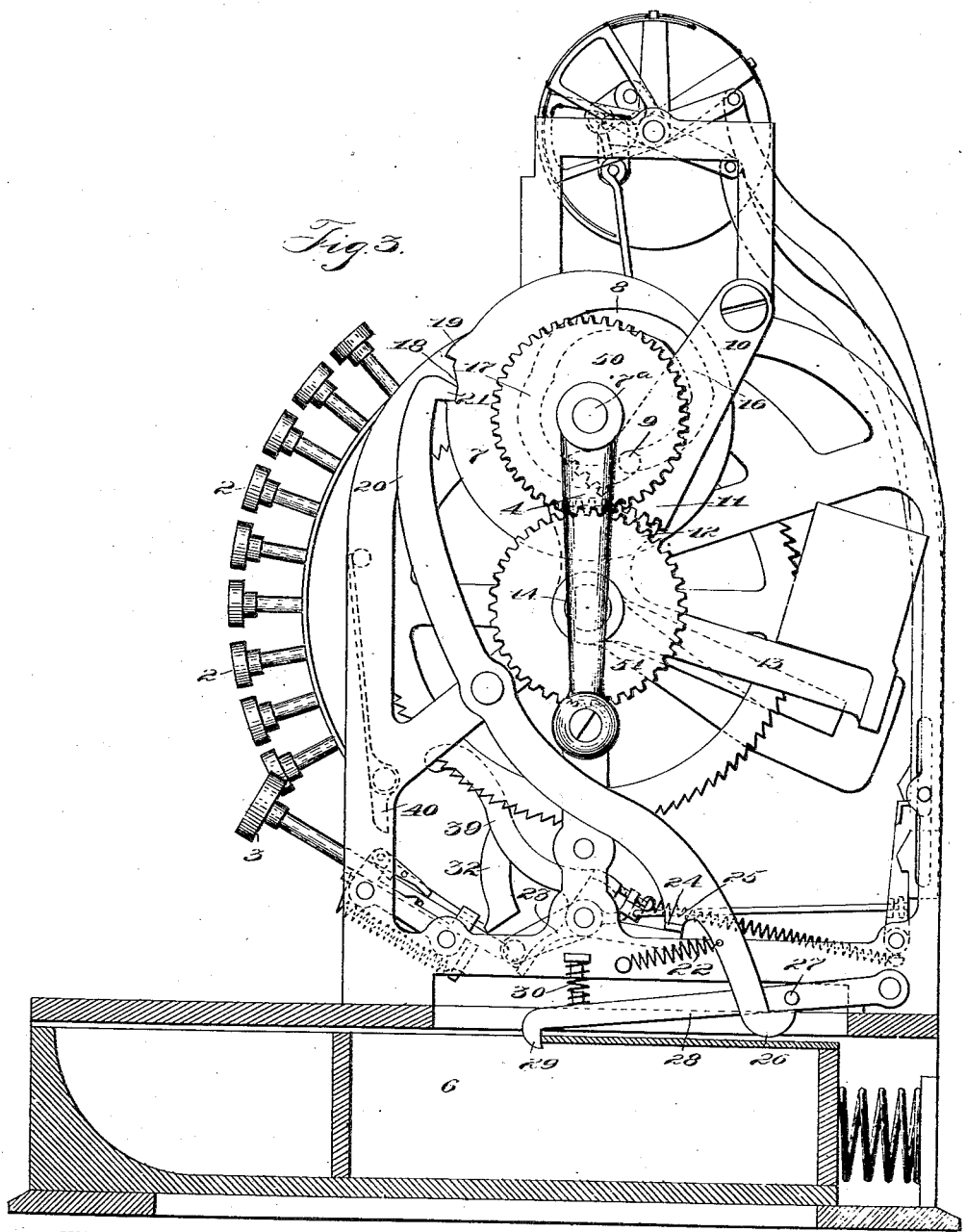

In the appended drawings forming part of this specification, Figure 1 represents a top plan view of the devices embodying my invention applied to a machine of the class mentioned. Fig. 2 represents an end elevation, partly in section of the same. Fig. 3 represents a view similar to Fig. 2 but taken from the opposite side. Fig. 4 represents a vertical section through my said improved devices on the line x—x of Fig. 1. Fig. 5 represents a vertical section through a modified form of said devices on the same line, a number of the parts being omitted for clearness. Fig. 6 represents a vertical section through my said improvements on line z—z of Fig. 1. Fig. 7 represents an enlarged detail top plan view of the modified form of latch lever operating frame. Fig. 8 represents an enlarged detail perspective view of the two cam grooved disks and the knife and platen operating levers. Fig. 9 represents an enlarged detail perspective view of the check knives and operating devices therefor. Fig. 10 represents a detail perspective view of one of the segmental toothed plates and its pendent arm and link. Fig. 11 represents an enlarged detail perspective view of the transfer devices and operating connections for one of the counter wheels and Fig. 12 represents a perspective view of the platen levers and platens.

In the aforesaid drawings 1 represents the frame of the machine; 2 the amount keys; 3 the special keys; 4 the operating handle and 5 the counter wheels.

As a great many of the parts illustrated in connection with my present invention are fully shown and described in the aforesaid patent I will not enter into a detail description of the same here but will refer to said patent for such description. The registering wheels, amount keys and indicators are practically of the construction and operation described in said patent with the following exceptions: The teeth of the registering wheels are reversed so that said wheels are actuated upon the up instead of upon the down strokes of the operating yokes. Instead of operating the parts by the closing of the cash drawer 6 I journal the aforesaid crank handle 4 upon the frame 1 and provide its journal shaft $7^a$ with a disk 7 formed on opposite sides with cam grooves 8 and 48 respectively; the former being arranged to receive an anti-friction roller 9 mounted upon a pivoted lever 10. This lever is formed at its free end with a segmental rack 11 which meshes with a similar segmental rack formed on a lever 12 which in turn is loosely mounted on a transverse operating shaft 14. The said lever 12 is formed integral with or connected to a yoke 13 which has its opposite ends journaled on said shaft 14 and straddles the counter wheels 5 so as to coöperate with the auxiliary counter operating yokes 15 to raise the same as fully described in said patent.

It will be seen from the above that the movement of the yoke 13 is positive in both directions as the roller 9 projecting into the groove 8 will first be moved outward and then inward again during one revolution of the handle 4 thus both elevating and depressing said yoke. It will further be observed by reference to Fig. 3 of the drawings that the cam groove 8 is formed with two concentric portions 16 and 17, the former to cause a temporary suspension of movement during the printing operation and the latter to allow for the action of the transfer devices. In addition to the above the disk 7 acts as a lock for the crank handle and also as a releasing means for the cash drawer 6 by being formed with a peripheral notch 18 and a cam projection 19. A pivoted lever 20 mounted on the frame 1 is formed with a nose 21 which normally projects into the notch 18 and thus locks the disk 7 against rotation. The said nose is held in the said notch under spring pressure by a coil spring 22 which is connected to the lever 20 and a portion of the frame but is drawn out of the same upon the operation of any one of the keys 3 in the following manner: Each of said keys 3 is arranged to engage and rock a pivoted spring pressed rock frame 23 having a projection 24 which in turn is arranged to engage a nose 25 formed on the lever 20. The said keys 3 and the rock frame 23 are fully described and illustrated in said patent and I will therefore not enter into a detail description here. The lower end of the lever 20 is formed with a hook 26 adapted to engage a pin 27 mounted on a pivoted latch lever 28 which latter is normally forced down by a coil spring 30 so that its hook end 29 engages a portion of the drawer 6 to hold it closed. The operation of any one of the keys 3 will operate the lever 20 sufficiently to draw the nose 21 out of the notch 18 but not sufficiently to cause the nose 26 to engage the pin 27. After the nose 21 leaves the notch 18 the disk 7 is free to be turned with said nose 21 bearing against its periphery. As the disk completes its rotation the cam projection 19 engages said nose 21 and thus operates the lever 20 to raise the latch lever 28 and release the cash drawer 6. The special keys 3 in the present instance are intended to govern the special counters as fully described in said patent but it is sometimes desirable to apply my invention to machines having but a single counter in which case the special keys are omitted and the lever 20 operated directly from the amount keys. This is accomplished as follows: Segmental plates 35 are pivoted on the shaft supporting the plates 31 and are formed respectively with a series of projections 34ª having inclined edges so located as to be engaged by the operating pins 35ª of the keys. Each of these plates 35 is provided with a pendent arm 35ᵇ which is provided at its lower end with a pin 35ᶜ; said pin projecting into a slot 36 formed in one of a series of link bars 37. Each of these bars is connected to a rock frame 38 mounted on the shaft 34 so that when any one of the segments 35 is elevated by the operation of a key the arm 32 and its respective link will cause said frame to operate the lever 20 in the same manner as the frame 23. The frame 38 further supports an arm 39 so that when it is operated by the depression of a key as above described said arm will engage the pivoted lid 40, which controls the transfer pawls hereinafter described, and hold the same firmly in position until the segment is released. Each bank of amount keys is provided with a detent segment 31 having a pendent rigid release arm 32 (see Fig. 5). The arm 32 is formed with an oblique lower edge which is so located as to be engaged by the cross bar of a pivoted yoke 33 and the said arm thus elevated to rock its segment and release the keys. The yoke 33 is loosely mounted on the shaft 34 and is operated in substantially the same manner as described in said Patent No. 610,492. It will thus be seen that the transfer pawls which are lifted by the lid by the opening of said lid cannot be so lifted after a key has been operated until the machine is returned to normal position and the said frame 38 again released. By this means any fraudulent opening of the lid 40 to lift the transfer pawls and prevent the transfer between the respective counter wheels taking place, is prevented. And further the rocking of the frame 38 by the operation of the amount keys releases the disk 7 and ultimately results in the unlatching of the cash drawer. The peculiar slot and pin connection between the respective arms 32 and the links 37 is necessary to permit the movement of the frame 38 when only a portion of the arms 32 are operated; the remaining unoperated arms thus not interfering with said movement.

The lid 40 is provided at one side with an apertured stud 40ª to which is connected a slide rod 40ᵇ adapted to abut at its upper end against an angular plate 40ᶜ which is fast to a rock shaft 40ᵈ. The opening of said lid 40 will force the rod 40ᵇ upward and rock the plate 40ᶜ and cause it to engage and lift the noses 40ᵉ of the transfer pawls 40ᶠ all of which will be more plainly seen by reference to Fig. 11. Each of said transfer pawls is mounted upon a pivoted arm 41ª; said arms receiving motion from a series of rock shafts 42 in substantially the same manner as described in the said patent with the exception that said operation takes place upon the down instead of upon the up stroke. Each of said pawls is further provided with a lug or projection 42ª which is adapted to be engaged by one of a series of spring pressed pivoted levers 42ᵇ and thus held temporarily in the position to which it is moved. The rear end of each of these latter levers is provided with a pin or stud 42ᶜ which abuts against the under side of one of a series of pivoted levers 42ᵈ. These levers are normally held with their free ends in proximity to the registering wheels and in the paths of the projections which mark the sections on said wheels so that when struck and operated by said projections they will cause the transfer pawls to be released and drop upon the registering wheels so as to operate the same upon being moved forward as above described by the rock shafts 42. These shafts receive motion through levers 43 substantially as described in said patent. The lever 43 is fast to a segmental rack plate 44 which is loose upon the shaft 14 and meshes with a segmental rack 45 formed on the end of a loop lever 46 which is pivoted upon the frame. An anti-friction roller 47 is mounted on said loop lever and projects into the cam slot 48 formed in the disk 7.

It will be observed from the above that each operation of the machine will cause the lever 43 to be first forced upward and then returned; said return movement being at such a period as to effect any transfer that may have become necessary because of the movement of the counter wheels which takes place during the first half of the movement of the machine. It will further be seen that this transfer takes place during the same operation of the machine and is not dependent upon a subsequent operation to complete it. The peculiar shape of the lever 46 is necessary because of the intervening parts between its segmental rack and its pivot point. The aforesaid crank shaft is also provided with a gear wheel 50 which meshes with a similar gear 51 fast on the shaft 14 which extends through a transverse sleeve 14$^a$ of the machine; said sleeve acting as a support for the several portions of the machine so that they will not interfere with the action of said shaft. A gear wheel 52 and a ratchet wheel 53 are mounted upon the opposite end of said shaft so as to rotate therewith. Said ratchet wheel is engaged by a spring pressed pawl 54 mounted on the frame for preventing any backward movement of the shaft while the gear 52 meshes with a similar gear 55 mounted on a shaft 56 which is journaled in the main frame. This shaft further carries two cam grooved disks 57 and 58 and a small gear wheel 59 which latter meshes with a gear wheel 60. This gear 60 is turn meshes with a gear 61 which carries a pinion 62; said pinion in turn meshing with a gear wheel 63. This latter wheel carries a friction roller 64 rigid therewith and over which the endless inking ribbon 65 passes and is thereby fed forward at each operation of the machine.

The elastic platens 66 and 67 which are located respectively above and below the printing wheels 68 hereinafter more fully described, are mounted upon bell crank levers 69 and 70 which are formed respectively with segmental racks 71; the teeth of said racks meshing so that the said levers are caused to move simultaneously. The lever 69 receives motion through the medium of an extension arm 72 with which it is provided and which carries an anti-friction roller 73 so located as to project into the cam groove of the disk 57 and thus receive motion upon the movement of said disk. The gears 60 and 61 are provided respectively with pressure rollers 74 and 75 between which the check strip 76 is fed so as to pass forward between the platen 66 and the printing wheels. The lever 70 is formed with an extension 77 which is provided with a pivoted pawl 78 the function of which is to feed the detail strip winding roller 79 forward by engaging a ratchet wheel 80 fast to said roller. Any backward movement of the roller is prevented by a pawl 81 mounted on the frame and engaging the said ratchet wheel. The detail strip 82 is supplied from a roller 83 and passes over transverse bars 84 which hold it in the proper printing position between the platen 67 and the printing wheels. The aforesaid endless inking ribbon 65 is supported in position about the printing wheels 68 by rollers 85 suitably mounted upon the main frame.

The aforesaid printing wheels 68 are provided on their peripheries with duplicate sets of type so as to be capable of making an impression at both the top and bottom platens. These wheels are mounted upon the ends of nested sleeves 86 and also upon a shaft 68$^a$ journaled at its inner end in a supporting bar 68$^b$, so as to be capable of independent movement in connection with their respective stop segments 87. These segments only move distances corresponding to the values of the keys operated and the segmental racks 88 with which they are provided will thus only move corresponding distances. These racks mesh respectively with pinions 89 mounted upon the inner end of the respective sleeves whereby the value of the movement of each rack is transmitted to its respective printing wheel.

It will be seen from the above that the movements of the segments 87 in one direction will set the printing wheels after which the platens will be operated in such time as to complete the printing operation before the return movement of said segments which returns the printing wheels to zero. After the check strip has been printed and fed forward it is severed by knives 90 and 91. The lower knife 90 is stationary while the upper knife 91 is supported by two pivoted links 92 and is adapted to receive motion from a link bar 93 pivoted thereto and formed at its upper end with an aperture through which projects a shouldered screw 94. This screw engages the outer end of a pivoted lever 95; the opposite end of said lever being provided with an anti-friction roller 96 which extends into the cam groove of the cam 58. When the said cam 58 is operated as before described the lever 95 is actuated and the link bar 93 depressed so as to also depress the knife 91 but as the latter is supported by the links 92 it cannot pass vertically downward but must swing downward in an incline direction thus securing a shearing cut when the two knives meet.

As the ribbon 65 is apt to become loose from stretching I provide a tension device comprising a pivoted yoke 97 and a weighted roller 98 mounted therein so as to engage said ribbon and hold it taut.

Having thus described my invention what I claim as new and desire to secure by Letters Patent is:

1. In a cash register, the combination with a registering mechanism, of transfer devices, means for rendering the transfer devices inoperative at will and devices for preventing the operation of said means during the usual operation of the machine.

2. In a cash register, the combination with an operating mechanism, of a series of keys, a cash drawer, a latch for the same, and a locking lever for the operating mechanism arranged to be operated by the keys to release said mechanism and subsequently to be operated by the latter to release the drawer latch.

3. In a cash register, the combination with a registering mechanism, of a series of keys, operating devices, a cash drawer, a notched disk, a locking lever engaging the same, a latch for the drawer arranged to be operated by said lever, means coöperating with the keys for operating said lever to release the cam disk, and a projection mounted on said disk and adapted to further operate the locking lever to release the drawer latch.

4. In a cash register, the combination with a registering mechanism, of a series of keys, operating devices, a cash drawer, a notched cam disk, a locking lever engaging the same, a latch for the drawer adapted to be operated by said lever and means coöperating with the keys for operating said lever to release the cam disk.

5. In a cash register, the combination with a registering mechanism, of an operating yoke, a crank handle, a cam grooved disk arranged to be operated by said handle, a pivoted lever having a rack and a projection which operates in the groove of said disk and a gear engaged by said rack and arranged to operate said yoke.

6. In a cash register, the combination with a registering mechanism, of transfer devices, hand operated means for rendering the transfer devices inoperative and a lock for said means arranged to be operated by the operation of the machine.

7. In a cash register, the combination with a registering mechanism, of a movable cover for concealing and guarding the same, a series of keys, detents for said keys, an operating handle for releasing the keys from the detents, and means for locking the cover against movement to expose the registering mechanism after the operation of a key and until the same is released from its respective detent.

8. In a cash register, the combination with a registering mechanism, of a series of keys, a cam connected to the operating parts, a lever arranged to lock said cam but be operated by it when unlocked, a cash drawer and a latch for said drawer arranged to be operated by said lever.

9. In a cash register, the combination with a registering mechanism, of transfer devices, a movable lid arranged to control said devices, a lock for the operating parts of the machine, and means coöperating with said lock for locking the lid closed after the operating parts of the machine have been released.

10. In a cash register the combination with a printing mechanism, of two pivoted arms carrying platens and having intermeshing racks so that they will move simultaneously, a cam disk engaging a projection on one of said levers, and feeding devices connected to one of said pivoted arms and arranged to move a detail strip at every operation of the machine.

11. In a cash register, the combination with a registering mechanism, of a series of keys, operating devices, a cash drawer, a latch for said drawer, and a lever for operating said latch arranged to normally lock the operating devices and be operated by them to raise the latch.

12. In a cash register, the combination with a registering mechanism, of a series of keys, a cash drawer, a single latching device engaging said drawer and the registering mechanism, means operated by the keys for actuating the latching device to release the registering mechanism, and means operated by said mechanism for further actuating said latching device to release the cash drawer.

13. In a cash register the combination with a registering mechanism, of transfer devices, a movable lid for concealing the registering mechanism adapted to control the transfer devices, and means for locking said lid after the movement of the machine has been commenced.

14. In a cash register the combination with a registering mechanism, of transfer devices, movable means for concealing the registering mechanism adapted to control the transfer devices, and devices for locking the movable means after the regular movement of the machine has been commenced.

15. In a cash register the combination with a registering mechanism, of a series of keys operating means, a cash drawer, a latch for said drawer and a device for locking the operating means arranged to be operated by the keys to release said means and also adapted to be operated by said means to operate the drawer latch.

16. In a cash register, the combination with a registering mechanism, of a main operating yoke, a series of registering yokes all arranged to be operated by the main yoke, an operating handle, a cam arranged to be operated by said handle, and a pivoted lever adapted to be operated by said cam and having a rack which operates said main yoke.

17. In a cash register, the combination with a registering mechanism, of a main operating yoke, a series of registering yokes all arranged to be operated by the main yoke, an operating handle, a cam arranged to be operated by said handle, a pivoted lever having a projection which engages said cam and means connecting said lever to the main yoke.

18. In a cash register, the combination with a registering mechanism, of a main operating yoke, a series of registering yokes all arranged to be operated by the main yoke, an operating handle, a cam grooved disk arranged to be operated by said handle and a pivoted lever having a projection which operates in the groove of said disk and a rack which operates said main yoke.

19. In a cash register, the combination with a registering mechanism, of transfer devices comprising a series of pawls, and rock shafts connected to said pawls, an operating lever for said shafts, a cam wheel, a pivoted lever arranged to be operated by said cam wheel and gearing connecting the two levers.

20. In a cash register, the combination with a registering mechanism, of a main operating yoke, a series of register operating yokes arranged to be all operated by the main yoke, a crank handle, a cam disk operated by said handle, and gearing connected to the main yoke and arranged to be actuated by the cam disk to reciprocate said yoke.

21. In a cash register, the combination with a registering mechanism, of a main operating yoke, a series of register operating yokes arranged to be all operated by the main yoke, an operating handle and gearing connecting said handle and main yoke for reciprocating the latter with a positive movement in each direction.

22. In a cash register, the combination with a registering mechanism, of a series of keys coöperating with the same, a pivoted main operating yoke, a series of register operating yokes arranged to be all operated by the main yoke, a crank handle and gearing connecting said handle and main yoke for giving the latter a positive movement in both directions with a continuous forward movement of the handle.

23. In a cash register, the combination with a registering mechanism, of transfer devices, means for rendering the transfer devices inoperative, a lock for the operating parts of the machine and mechanism coöperating with said lock for locking the aforesaid means against operation after the operating parts of the machine have been released.

24. In a cash register, the combination with a registering mechanism, of transfer devices, a series of keys, movable means for rendering the transfer devices inoperative, a lock for the operating parts of the machine, and means operated by the keys to actuate said lock and also lock said movable means.

25. In a cash register, the combination with a registering mechanism, of a series of keys, a cash drawer, a lid for concealing the registering mechanism, drawer releasing devices, and means connected to the keys for setting the drawer releasing devices and locking said lid.

26. In a cash register the combination with a registering mechanism, of a series of keys, a concealing and guarding device for the registering mechanism, an operating handle, a lock for said handle and means operated by the keys for unlocking the operating handle and locking the concealing device against movement to expose the registering mechanism.

27. In a cash register, the combination with a registering mechanism, of a concealing and guarding lid for the same, a series of keys, a crank handle, a lock for the handle and means operated by the keys for unlocking the handle and locking the concealing lid against movement to expose the registering mechanism.

28. In a cash register, the combination with a printing mechanism, of a stationary knife, a movable knife, pivoted links supporting said movable knife so that it will have a shearing cut, a lever for operating said knife, a cam grooved wheel and a projection on said lever extending into the groove of said wheel.

29. In a cash register, the combination with a registering mechanism, of a series of keys, a cam connected to the operating parts, an operating lever arranged to lock said cam but be operated by it when unlocked, a cash drawer, a drawer latch arranged to be operated by said lever, and means connected to the keys for giving the lever an initial movement to unlock the cam.

30. In a cash register, the combination with a registering mechanism, of a series of keys, a cam connected to the operating parts, an operating lever arranged to lock said cam but be operated by it when unlocked, means connected to the keys for giving the lever an initial movement to unlock the cam, a cash drawer, and a drawer latch operated by said lever.

31. In a cash register, the combination with a printing mechanism, of two pivoted arms carrying platens and having intermeshing racks so that they will move simultaneously, a cam grooved disk and a projection on one of said arms extending into said cam groove.

32. In a cash register the combination with a registering mechanism, of a movable cover for concealing and guarding the same, a series of keys, and means for automatically locking the cover against movement to expose the registering mechanism after the operation of a key and until the same is returned to its normal position.

33. In a cash register, the combination with a registering mechanism, of a movable cover for concealing and guarding the same, and means for automatically locking the cover against movement to expose the registering mechanism when the parts are out of normal position.

34. In a cash register the combination with a registering mechanism, of a movable cover for concealing and guarding the same, a movable lever for locking said guard against movement during the operation of the machine and a cam disk and connection for operating the movable lever.

35. In a cash register the combination with an oscillatory main yoke, of a series of auxiliary yokes arranged to be operated thereby, means for limiting the movements of the auxiliary yokes, a rotary crank handle, and means intermediate the crank handle and main yoke for moving it positively in both directions.

36. In a cash register the combination with a main yoke, of a series of auxiliary yokes operated thereby, means for limiting the movements of the auxiliary yokes, a series of type carriers, means for maintaining an unbroken connection between the type carriers and the auxiliary yoke, a platen, and means for returning the auxiliary yokes arranged to first operate the platen.

37. In a cash register the combination with a main yoke, of a series of auxiliary yokes operated thereby, means for limiting the movements of the auxiliary yokes, rack segments carried by said auxiliary yokes, a series of type carriers, and gearing positively connecting the rack segments and the type carriers, for maintaining an unbroken connection between the same.

38. In a cash register the combination with a main yoke, of a series of auxiliary yokes, means for limiting the movements of the auxiliary yokes, a series of type carriers, means for maintaining an unbroken connection between the type carriers and auxiliary yokes, a platen, and means for operating the platen and raising and lowering the main yoke.

39. In a cash register the combination with an operating mechanism, of a cash drawer, a latch for the same, and a latch for the operating mechanism, constructed to be operated by the latter to actuate the drawer latch.

40. In a cash register the combination with a series of auxiliary yokes, of a main operating yoke, printing devices controlled by the auxiliary yokes, a platen for the printing devices, and a common operating means for positively raising and lowering the main yoke and operating the platen.

In testimony whereof I affix my signature, in the presence of two witnesses.

JOSEPH P. CLEAL.

Witnesses:
HARVEY CONOVER,
WILLIAM MUZZY.